United States Patent
Masuda et al.

(10) Patent No.: US 8,771,789 B2
(45) Date of Patent: Jul. 8, 2014

(54) METHOD FOR PRODUCING MELT SUPPLY PIPE FOR ALUMINUM DIE CASTING

(71) Applicant: Toshiba Kikai Kabushiki Kaisha, Tokyo (JP)

(72) Inventors: Jun Masuda, Shizuoka-ken (JP); Ryosuke Fujimoto, Shizuoka-ken (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/675,830

(22) Filed: Nov. 13, 2012

(65) Prior Publication Data

US 2013/0139372 A1   Jun. 6, 2013

Related U.S. Application Data

(62) Division of application No. 11/565,771, filed on Dec. 1, 2006, now Pat. No. 8,333,920.

(30) Foreign Application Priority Data

Dec. 2, 2005 (JP) ................................. 2005-348830

(51) Int. Cl.
*C21D 8/10* (2006.01)

(52) U.S. Cl.
USPC .......................................... 427/205; 266/236

(58) Field of Classification Search
USPC ........................... 427/180, 202, 205; 266/236
See application file for complete search history.

(56) References Cited

U.S. PATENT DOCUMENTS

| | | | |
|---|---|---|---|
| 3,495,630 A | 2/1970 | Hansen et al. | |
| 4,197,902 A | 4/1980 | Von Jan et al. | |
| 4,733,715 A | 3/1988 | Matsuzaki | |
| 4,868,069 A | 9/1989 | Darrow | |
| 4,951,888 A | 8/1990 | Sharpe et al. | |
| 4,995,427 A | 2/1991 | Berchem | |
| 4,996,114 A | 2/1991 | Darrow | |
| 7,829,138 B2 * | 11/2010 | Masuda et al. | 427/180 |
| 8,333,920 B2 | 12/2012 | Masuda | |

(Continued)

FOREIGN PATENT DOCUMENTS

| EP | 06 95 998 | 2/1996 |
|---|---|---|
| JP | 51-20303 | 2/1976 |

(Continued)

OTHER PUBLICATIONS

JP 2001-342530 English Machine Translation, Honma et al., Dec. 2001.

(Continued)

*Primary Examiner* — Scott Kastler
(74) *Attorney, Agent, or Firm* — DLA Piper LLP (US)

(57) ABSTRACT

Methods are disclosed for producing melt supply pipes. In one illustrative implementation, there is provided a method for producing a melt supply pipe, composed of an inner ceramic pipe and an outer steel pipe fitted to the inner pipe, the melt supply pipe directed to connecting a melting furnace and a plunger sleeve of a die casting machine. Moreover, the method may include forming a Ni alloy layer over the inner circumferential surface of the outer steel pipe, burying the outer pipe in and bonding the surface of the Ni alloy layer to TiC particles, and fitting the inner ceramic pipe into the outer pipe with the TiC particles bonded to the inner circumferential surface.

20 Claims, 3 Drawing Sheets

(56) References Cited

U.S. PATENT DOCUMENTS

| | | |
|---|---|---|
| 2005/0116192 A1 | 6/2005 | Vincent |
| 2007/0144627 A1 | 6/2007 | Masuda et al. |
| 2007/0196684 A1 | 8/2007 | Masuda |

FOREIGN PATENT DOCUMENTS

| | | | |
|---|---|---|---|
| JP | 03-126681 | | 5/1991 |
| JP | 07-001077 | | 1/1995 |
| JP | 08/025063 | | 1/1996 |
| JP | 08-132215 | | 5/1996 |
| JP | 08-229657 | | 9/1996 |
| JP | 2000-351054 | | 12/2000 |
| JP | 2001-287004 | | 10/2001 |
| JP | 2001-300711 | | 10/2001 |
| JP | 2001-342530 | | 12/2001 |
| JP | 2002-066708 | | 3/2002 |
| JP | 2003-170262 | | 6/2003 |
| JP | 2005-264306 | | 9/2005 |
| KR | 10-1987-11269 | | 12/1987 |
| WO | WO2005/090637 | * | 9/2005 |

OTHER PUBLICATIONS

JP 2001-300711 English Machine Translation, Negishi, Oct. 2001.
JP 08-229657 English Machine Translation, Nakayama et al., Sep. 1996.
JP 76020303, Nippon Tungsten KK, Jun. 1976, Titanium Carbide Cement Scraping Tool Formed as a Nitrided Layer on Steel Substrate, English Abstract from DWPI Database.
International Preliminary Examination Report for PCT/JP05/000510, Jan. 2007.
Notice of Allowance issued in related Korean Parent Application No. 2006-018288, mailed Apr. 4, 2008.
English language abstract of JP 03-126681, published May 29, 1991.
Machine English language translation of JP 08-025063, published Jan. 30, 1996.
English Abstract of JP 08-025063 published Jan. 30, 1996.
Machine English language translation of JP 2001-287004, published Oct. 16, 2001.
English Abstract of JP 2001-287004 published Oct. 16, 2001.
English language abstract of KR 10-1987-0011269, published Dec. 22, 1987.
International Search Report of PCT/JP2007/056048.
English Language Abstract for JP 2005 264306 published Sep. 29, 2005.
English Language translation of JP-2005-264306 published Sep. 29, 2005.
English Language Abstract for JP 2000 351054 published Dec. 19, 2000.
English Language translation of JP-2000-351054 published Dec. 19, 2000.
English Language Abstract for JP 2002 066708 published Mar. 5, 2002.
English Language translation of JP-2002-066708 published Mar. 5, 2002.
English Language Abstract for JP 08-229657 published Sep. 1, 1996.
English Language Abstract for JP 2001-300711 published Oct. 30, 2001.
English Language Abstract for JP 2001-342530 published Dec. 14, 2001.
English language translation of International Preliminary Report on Patentability issued in Application No. PCT/JP07/056048 mailed Nov. 13, 2008.
International Search Report issued in PCT/JP05/05100 on Jul. 5, 2005.
Japanese Office Action issued in Application No. 2004-82990 mailed Apr. 7, 2009.
English Translation of Japanese Office Action issued in Application No. 2004-82990 mailed Apr. 7, 2009.
Machine English language translation of JP 07-001077, published Jan. 6, 1995.
English Abstract of JP 07-001077 published Jan. 6, 1995.
Machine English language translation of JP 2003-170262, published Jun. 17, 2003.
English Abstract of JP 2003-170262 published Jun. 17, 2003.
Machine English language translation of JP 08-132215, published May 28, 1996.
English Abstract of JP 08-132215 published May 28, 1996.
File History of U.S. Appl. No. 10/599,118.
File History of U.S. Appl. No. 11/565,771.
File History of U.S. Appl. No. 12/891,477.
File History of U.S. Appl. No. 12/293,556.

* cited by examiner

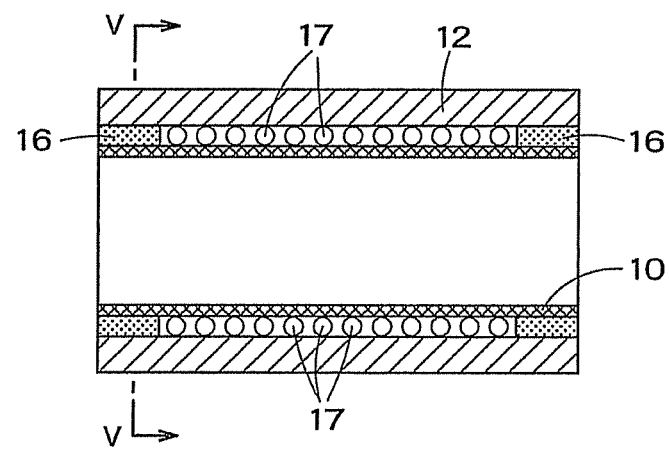
F I G. 4
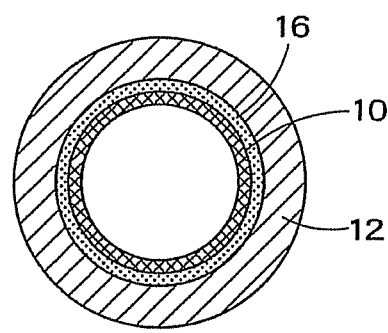
F I G. 5

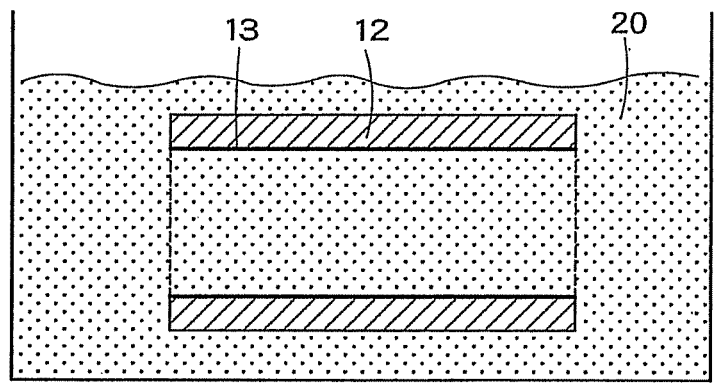
F I G. 6
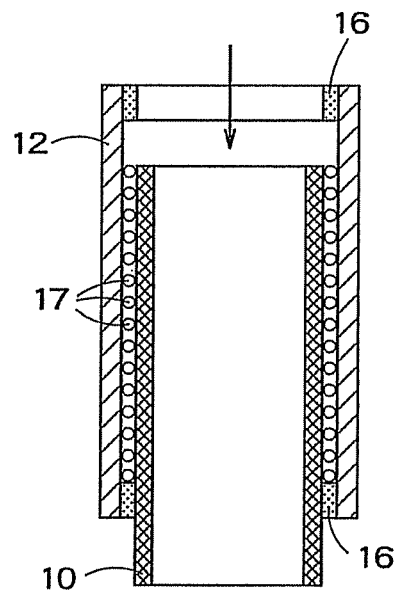
F I G. 7

METHOD FOR PRODUCING MELT SUPPLY PIPE FOR ALUMINUM DIE CASTING

This application is a divisional of U.S. application Ser. No. 11/565,771 filed Dec. 1, 2006, now U.S. Pat. No. 8,333,920 issued on Dec. 18, 2012. U.S. application Ser. No. 11/565,771 claims priority to Japanese Patent Application No. 2005-348830 filed Dec. 2, 2005. The entirety of all of the above-listed Applications are incorporated herein by reference.

BACKGROUND OF THE INVENTION

1. Field of the Invention

The present invention relates to a melt supply pipe for supplying a molten aluminum alloy from a melting furnace to a plunger sleeve of a die casting machine in aluminum die casting.

2. Background Art

In conventional die casting machines, a ladle method has been commonly employed for supplying a molten aluminum alloy to a plunger sleeve. According to the ladle method, a molten aluminum alloy is drawn from a melting furnace by means of a ladle and supplied to a plunger sleeve.

As a technique to take the place of the ladle method, a melt supply pipe method has recently been attracting attention which involves directly connecting a melting furnace and a plunger sleeve with a melt supply pipe, and supplying a molten aluminum alloy through the melt supply pipe to the plunger sleeve. Mixing of an Al oxide film or solid broken pieces into a molten aluminum alloy can be significantly reduced with the melt supply pipe method as compared to the conventional ladle method. The melt supply pipe method thus has the advantage that it can provide a higher-quality die-cast product.

A conventional melt supply pipe, which has so far been used to connect a melting furnace and a plunger sleeve, has such a structure that a heater is wrapped around a ceramic pipe. A ceramic material is used for a melt supply pipe because the material has high melting loss resistance to a molten aluminum alloy.

While a ceramic pipe is thus strong to a molten aluminum alloy, it is weak to impact and can be broken by its vibration during operation or by erroneous handling upon its maintenance. Further, only an insufficient load can be applied on the connecting portions of such a breakable ceramic pipe, which could cause leakage of a molten aluminum alloy from the connecting portions.

The applicant has proposed a molten aluminum alloy-contact member having enhanced melting loss resistance to a molten aluminum alloy, comprising a steel base, a Ni alloy layer formed on the steel base, and TiC bonded in a particulate state to the surface of the Ni alloy layer (Japanese Patent Laid-Open Publication No. 2005-264306).

Further, a melt supply pipe is known which has such a structure that a ceramic or graphitic pipe is encased in a steel pipe for the purpose of covering the breakableness of the inner pipe. However, because of a large difference in thermal expansion coefficient between the steel pipe and the ceramic or graphitic pipe, a large gap can be formed between the inner and outer pipes due to their different thermal expansions. A molten aluminum alloy will easily intrude into the gap, which may result in melting loss of the steel pipe and formation of holes therein in a short period of time.

SUMMARY OF THE INVENTION

It is therefore an object of the present invention to solve the above problems in the prior art and provide a melt supply pipe for aluminum die casting which is strong to mechanical impact and is excellent in the melting loss resistance to a molten aluminum alloy and which has a significantly extended life, and a method for producing the melt supply pipe.

In order to achieve the object, the present invention provides a melt supply pipe for connecting a melting furnace and a plunger sleeve of a die casting machine, comprising an inner ceramic pipe and an outer steel pipe fitted to the inner pipe, wherein a Ni alloy layer is formed over the inner circumferential surface of the outer steel pipe, and TiC particles are bonded to the surface of the Ni alloy layer.

In a preferred embodiment of the present invention, the TiC particles have an average particle diameter of 10 to 500 µm, and are bonded to the Ni alloy layer in such a state that the particles are not fully covered with the Ni alloy layer but partly protrude from the surface of the Ni alloy layer.

The Ni alloy preferably has the composition of 2.6 to 3.2% of B, 18 to 28% of Mo, 3.6 to 5.2% of Si and 0.05 to 0.22% of C, with the remainder being Ni and unavoidable impurities.

In a preferred embodiment of the present invention, gaps in the TiC particles are filled in with powder comprising at least one of boron nitride (BN), alumina ($Al_2O_3$), zirconia ($ZrO_2$) and silicon nitride ($Si_3N_4$).

In a preferred embodiment of the present invention, a pair of fibrous sheet members, composed of an inorganic material having the property of expanding by heating, is sandwiched between the inner ceramic pipe and the outer steel pipe at both ends of the pipes. Preferably, the gap formed between the inner ceramic pipe and the outer steel pipe and defined by the sheet members, is filled with a spherical or particulate ceramic filler.

The present invention also provides a method for producing a melt supply pipe, composed of an inner ceramic pipe and an outer steel pipe fitted to the inner pipe, for connecting a melting furnace and a plunger sleeve of a die casting machine, comprising the steps of: forming a Ni alloy layer over the inner circumferential surface of the outer steel pipe; burying the outer pipe with the Ni alloy layer in TiC powder, and heating the pipe and the powder under vacuum in a vacuum heating oven to a temperature at which a liquid phase is generated from the Ni alloy, thereby bonding the TiC particles to the surface of the Ni alloy layer; and fitting the inner ceramic pipe into the outer pipe with the TiC particles bonded to the inner circumferential surface, thereby assembling the melt supply pipe.

According to the present invention, the outer steel pipe can protect the inner ceramic pipe from mechanical impact and, in addition, enables application of a sufficient clamp load on the terminal connecting portions of the melt supply pipe, thereby preventing leakage of a molten aluminum alloy. Furthermore, owing to TiC particles densely scattered over the inner circumferential surface of the outer pipe, the present melt supply pipe has significantly enhanced melting loss resistance to a molten aluminum alloy. Thus, the melting supply pipe of the present invention, having both high impact resistance and high meting loss resistance, can enjoy a significantly extended life.

BRIEF DESCRIPTION OF THE DRAWINGS

FIG. 4 is a vertical sectional diagram showing a melt supply pipe for aluminum die casing according to a second embodiment of the present invention;

FIG. 5 is a cross-sectional diagram taken along the line V-V of FIG. 4;

FIG. 6 is a diagram illustrating a method for producing a melt supply pipe for aluminum die casting according to the present invention; and FIG. 7 is a diagram illustrating the step of fitting an inner pipe into an outer pipe in the method for producing a melt supply pipe for aluminum die casting according to the present invention.

DETAILED DESCRIPTION OF THE PREFERRED EMBODIMENTS

Preferred embodiments of the present invention will now be described in detail with reference to the drawings.

Figure 1:
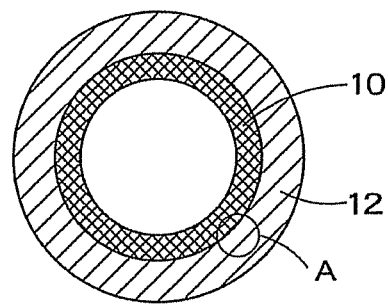
FIG. 1 is a cross-sectional diagram showing a melt supply pipe for aluminum die casting according to a first embodiment of the present invention.

FIG. 1 is a cross-sectional diagram showing the structure of a melt supply pipe according to a first embodiment of the present invention. In FIG. 1, reference numeral 10 denotes an inner ceramic pipe and reference numeral 12 denotes an outer steel pipe. The inner pipe 10/outer pipe 12 integral structure of the melt supply pipe is obtained by fitting the outer pipe 12 to the inner pipe 10.

Figure 2:
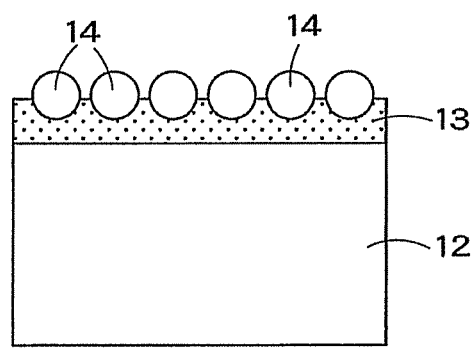
FIG. 2 is an enlarged illustration of the portion A of FIG. 1.
Figure 3:
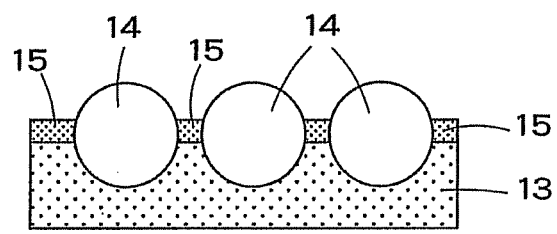
FIG. 3 is a diagram corresponding to FIG. 2, illustrating the case of filling in the gaps in TiC particles with fine ceramic particles.

As shown in FIG. 2 which is an enlarged view of the portion A of FIG. 1, the entire inner circumferential surface of the outer steel pipe 12 is coated with a Ni alloy layer 13, and the surface of the Ni alloy layer 13 is covered with a myriad of titanium carbide (TiC) particles. The TiC particles 14 are bonded in a particulate state to the Ni alloy layer 13 such that they partly protrude from the surface of the Ni alloy layer 13. Preferably, the gaps in the TiC particles are filled in with fine ceramic particles 15 comprising at least one of boron nitride (BN), alumina ($Al_2O_3$), zirconia ($ZrO_2$) and silicon nitride ($Si_3N_4$), as shown in FIG. 3. The fine ceramic particles 15 can improve the melting loss resistance of the base Ni alloy layer 13 to which the TiC particles 14 are bonded.

According to the melt supply pipe of this embodiment, which employs the combination of the inner ceramic pipe 10 and the outer steel pipe 12, the outer steel pipe 12 can protect the inner ceramic pipe 10 from external mechanical impact and, in addition, enables application of a sufficient clamp load on the terminal connecting portions of the melt supply pipe, thereby preventing leakage of a molten aluminum alloy.

Furthermore, the TiC particles 14 are bonded to the Ni alloy layer 13 formed over the inner circumferential surface of the outer steel pipe 12. The TiC particles 14 have the property of repelling a molten aluminum alloy. By utilizing this property, direct contact of a molten aluminum alloy with the steel material, constituting the main body of the outer pipe 12, can be prevented and the melting loss resistance of the outer pipe can thus be enhanced. Further, the TiC particles 14 are made to partly extrude from the surface of the Ni alloy layer 13. This can increase the contact angle with a molten aluminum alloy, thereby enhancing the property of repelling the molten aluminum alloy.

In the structure that the TiC is bonded in a particulate state to the Ni alloy layer 13 and densely scattered over the layer, a large thermal stress will not act on the TiC particles 14 even when the outer pipe 12 thermally expands or contracts. Thus, the TiC particles 14 hardly peel off and, therefore, the melting loss resistance can be maintained for a long period of time.

Though FIG. 2 schematically shows the TiC particles 14 lining up side by side, there is actually a case in which the TiC particles 14 are piled up in multiple layers.

The base Ni alloy layer 13, to which the TiC particles 14 are bonded, itself has poor melting loss resistance to a molten Al alloy. The melting loss resistance can be improved by attaching the fine ceramic particles 15 to the Ni alloy layer 13, as shown in FIG. 3. Since the attached fine ceramic particles 15 are present such that they fill in the gaps in the TiC particles 14, the fine ceramic particles 15 hardly fall off upon contact with a molten aluminum alloy. It is possible that the fine ceramic particles 15 may adhere also to the surfaces of the protruding portions of the TiC particles 14.

The inner pipe 12, on the other hand, can be made to resist melting loss for a long period of time by selecting a ceramic material having excellent melting loss resistance to a molten aluminum alloy. A preferable ceramic material may comprise at least one of $Al_2O_3$, SiC, $Si_3N_4$, MgO, $Al_2TiO_5$, $ZrO_2$, and sialon.

A melt supply pipe for aluminum die casting according to a second embodiment of the present invention will now be described with reference to FIGS. 4 and 5.

In the melt supply pipe of the second embodiment, a pair of fire-resistant sheets 16 is sandwiched between the inner ceramic pipe 10 and the outer steel pipe 12 at both ends of the pipes, and the gap formed between the inner and outer pipes and defined by the fire-resistant sheets 16 is filled with ceramic balls 17.

The fire-resistant sheet 16 is a sheet member composed of inorganic fibers having the property of expanding by heating. Preferably, each fire-resistant sheet 16 extends over the entire circumference, and the outer end of the sheet is aligned with the end surfaces of the inner pipe 10 and the outer pipe 12. The balls 17 are a spherical filler formed of a ceramic material comprising at least one of $Al_2O_3$, SiC, $Si_3N_4$, MgO, $Al_2TiO_5$, $ZrO_2$, and sialon. It is also possible to use a particulate filler instead of the balls 17.

According to the second embodiment, there is no gap between the inner ceramic pipe 10 and the outer steel pipe 12 at both ends of the pipes because of the presence of the fire-resistant sheets 16. Even when a gap is formed between the inner pipe 10 and the outer pipe 12 upon heating by a molten aluminum alloy, due to a difference in thermal expansion coefficient between the pipes, the fire-resistant sheets 16 can prevent the molten aluminum alloy from intruding into the gap.

Since the internal gap defined by the fire-resistant sheets 16 and the inner and outer pipes 10, 12 is filled with the balls 17, the weight of a molten aluminum alloy flowing in the inner ceramic pipe is supported by the balls 17, so that application of the weight of the molten aluminum alloy on the inner pipe 10 can be prevented.

A description will now be made of a method for producing the melt supply pipe for aluminum die casting, according to the present invention.

The inner ceramic pipe 10 and the outer steel pipe 12 are prepared in advance, and the melt supply pipe is produced by the following procedure:

First, the Ni alloy layer 13 is formed by thermal spraying on the inner circumferential surface of the outer pipe 12. Thereafter, a vessel containing TiC powder 20 is prepared, and the outer pipe 12 is entirely buried in the TiC powder 20, as shown in FIG. 6.

The vessel, containing the TiC powder 20 and the outer pipe 12 buried in it, is placed in a vacuum heating oven, and heated under vacuum to a temperature at which a liquid phase is generated from the Ni alloy, thereby bonding TiC particles 14 to the surface of the Ni alloy layer 13.

By the heating in this step, the TiC particles 14 are bonded to the Ni alloy layer in such a state that they protrude from the surface of the Ni alloy layer 13, as shown in FIG. 2. In this connection, it is undesirable if the TiC particles 14 become entirely covered with the melting Ni alloy in the heating process. In order not to entirely cover the TiC particles 14 with the Ni alloy but to strongly bond the TiC particles 14 to the Ni alloy layer 13 with the particles partly exposed on the surface of the Ni alloy layer 13, the average particle diameter of the TiC particles 14 is preferably made within the range of 10 to 500 μm.

When the average particle diameter of the TiC particles 14 is smaller than 10 μm, it is difficult to control the temperature during the vacuum heating so that the TiC particles 14 may not be entirely covered with the liquid phase of the Ni alloy. The intended melting loss resistance will not be obtained if the TiC particles 14 are entirely covered with the liquid phase of the Ni alloy.

When the average particle diameter of the TiC particles 14 is larger than 500 μm, on the other hand, the liquid phase of the Ni alloy will cover only lower portions of the particles with small contact area, resulting in weak bonding strength between the Ni alloy layer 13 and the TiC particles 14. Accordingly, the TiC particles 14 will easily fall off.

After the bonding of TiC particles 14 to the Ni alloy layer 13, the outer pipe 12 is subjected to a process comprising applying a slurry of a mixture of a binder and a fine ceramic powder comprising at least one of boron nitride (BN), alumina ($Al_2O_3$), zirconia ($ZrO_2$) and silicon nitride ($Si_3N_4$) to the inner circumferential surface of the outer pipe 12, and burning the ceramic powder into the inner circumferential surface.

As shown in FIG. 3, the TiC particles 14 can be bonded to the Ni alloy layer 13 with high strength through generation of the liquid phase from the Ni alloy. Further, because of good wetting between the liquid phase and the TiC particles 14, a large number of TiC particles 14 can be densely bonded to the Ni alloy layer 13.

Next, as shown in FIG. 7, the inner pipe 10 is inserted into the outer pipe 12. Prior to the insertion, the fire-resistant sheets 16 are placed on the inner circumference surface of the outer pipe 12 at its both ends such that each sheet 16 extends over the entire circumference. After inserting one end of the inner pipe 10 and before inserting the other end into the outer pipe 12, the ceramic balls 17 are filled into the gap between the inner pipe 10 and the outer pipe 12. Thereafter, the inner pipe 10 is completely inserted into the outer pipe 12 till the other end of the inner pipe 10 reaches the fire-resistant sheet 16.

The thus-produced melt supply pipe was fixed in an actual die casting machine to carry out a durability test by repeating a casting cycle of supplying a molten aluminum alloy from a melting furnace through the melt supply pipe to a plunger sleeve of the die casting machine. The test conditions were as follows: the type of molten aluminum alloy, JIS AC4CH, the melt temperature, 72° C.; and the temperature of a melt supply pipe heater, 720° C. Comparative durability tests were also carried out under the same conditions but using, instead of the present melt supply pipe, a comparative ceramic melt supply pipe 1 (composition: 70% SiC/30% $Si_3N_4$) (comp. test 1) or a comparative melt supply pipe 2 composed of an outer steel (JIS S45C) pipe and an inner graphitic pipe thermally inserted into the outer pipe (comp. test 2).

As a result, a connecting portion of the comparative melt supply pipe 1 broke and the melt began to leak out after about 40,000 shots in comp. test 1. In comp. test 2, a connecting portion of the comparative melt supply pipe 2 broke by melting loss and the melt began to leak out after about 8000 shots. The early melting loss in comp. test 2 is considered to be caused by early formation of a gap between the graphitic pipe and the steel pipe due to a large difference in thermal expansion coefficient therebetween. Thus, intrusion of the melt into the gap may have caused melting loss of the steel pipe. In contrast, no defect, such as melting loss, was found in the melt supply pipe of the present invention even after 120,000 shots, and the operation could be continued.

What is claimed is:

1. A method for producing a melt supply pipe, composed of an inner ceramic pipe and an outer steel pipe fitted to the inner pipe, for connecting a melting furnace and a plunger sleeve of a die casting machine, comprising the steps of:

forming a Ni alloy layer over the inner circumferential surface of the outer steel pipe;

burying the outer pipe with the Ni alloy layer in TiC powder, and heating the pipe and the powder under vacuum in a vacuum heating oven to a temperature at which a liquid phase is generated from the Ni alloy, thereby bonding the TiC particles to the surface of the Ni alloy layer; and fitting the inner ceramic pipe into the outer pipe with the TiC particles bonded to the inner circumferential surface, thereby assembling the melt supply pipe.

2. The method for producing a melt supply pipe according to claim 1, wherein after bonding the TiC particles to the inner circumferential surface of the outer pipe, a slurry of a mixture of a binder and powder comprising at least one of boron nitride (BN), alumina ($Al_2O_3$), zirconia ($ZrO_2$) and silicon nitride ($Si_3N_4$) is applied to the inner circumferential surface of the outer pipe, followed by burning of the powder into the inner circumferential surface.

3. The method for producing a melt supply pipe according to claim 1, wherein one end of the inner ceramic pipe is inserted into the outer steel pipe with a pair of fibrous sheet members, composed of an inorganic material having the property of expanding by heating, placed on the inner circumferential surface of the outer pipe at its both ends such that each sheet member extends over the entire circumference, and, before inserting the other end of the inner pipe into the outer pipe, a spherical or particulate ceramic filler is filled into the gap formed between the inner and outer pipes and defined by one of the sheet members.

4. The method for producing a melt supply pipe according to claim 1, wherein the TiC particles have an average particle diameter of about 10 to about 500 μm.

5. The method for producing a melt supply pipe according to claim 1, wherein the TiC particles are bonded to the Ni alloy layer in such a state that the particles are not fully covered with the Ni alloy layer but partly protrude from the Ni alloy layer.

6. The method for producing a melt supply pipe according to claim 1, wherein the Ni alloy, in addition to Ni, comprises about 2.6 to about 3.2% of B, about 18 to about 28% of Mo, about 3.6 to about 5.2% of Si and about 0.05 to about 0.22% of C.

7. The method for producing a melt supply pipe according to claim 1, wherein gaps in the TiC particles are filled in with powder comprising at least one of boron nitride (BN), alumina ($Al_2O_3$), zirconia ($ZrO_2$) and silicon nitride ($Si_3N_4$).

8. The method for producing a melt supply pipe according to claim 2, wherein one end of the inner ceramic pipe is inserted into the outer steel pipe with a pair of fibrous sheet members, composed of an inorganic material having the property of expanding by heating, placed on the inner circumferential surface of the outer pipe at its both ends such that each sheet member extends over the entire circumference, and, before inserting the other end of the inner pipe into the outer pipe, a spherical or particulate ceramic filler is filled into the gap formed between the inner and outer pipes and defined by one of the sheet members.

9. The method for producing a melt supply pipe according to claim 2, wherein the TiC particles have an average particle diameter of about 10 to about 500 μm.

10. The method for producing a melt supply pipe according to claim 2, wherein the TiC particles are bonded to the Ni alloy layer in such a state that the particles are not fully covered with the Ni alloy layer but partly protrude from the Ni alloy layer.

11. The method for producing a melt supply pipe according to claim 2, wherein the Ni alloy, in addition to Ni, comprises about 2.6 to about 3.2% of B, about 18 to about 28% of Mo, about 3.6 to about 5.2% of Si and about 0.05 to about 0.22% of C.

12. The method for producing a melt supply pipe according to claim 2, wherein gaps in the TiC particles are filled in with powder comprising at least one of boron nitride (BN), alumina ($Al_2O_3$), zirconia ($ZrO_2$) and silicon nitride ($Si_3N_4$).

13. The method for producing a melt supply pipe according to claim 3, wherein the TiC particles have an average particle diameter of about 10 to about 500 μm.

14. The method for producing a melt supply pipe according to claim 3, wherein the TiC particles are bonded to the Ni alloy layer in such a state that the particles are not fully covered with the Ni alloy layer but partly protrude from the Ni alloy layer.

15. The method for producing a melt supply pipe according to claim 3, wherein the Ni alloy, in addition to Ni, comprises about 2.6 to about 3.2% of B, about 18 to about 28% of Mo, about 3.6 to about 5.2% of Si and about 0.05 to about 0.22% of C.

16. The method for producing a melt supply pipe according to claim 3, wherein gaps in the TiC particles are filled in with powder comprising at least one of boron nitride (BN), alumina ($Al_2O_3$), zirconia ($ZrO_2$) and silicon nitride ($Si_3N_4$).

17. The method for producing a melt supply pipe according to claim 4, wherein the TiC particles are bonded to the Ni alloy layer in such a state that the particles are not fully covered with the Ni alloy layer but partly protrude from the Ni alloy layer.

18. The method for producing a melt supply pipe according to claim 4, wherein the Ni alloy, in addition to Ni, comprises about 2.6 to about 3.2% of B, about 18 to about 28% of Mo, about 3.6 to about 5.2% of Si and about 0.05 to about 0.22% of C.

19. The method for producing a melt supply pipe according to claim 4, wherein gaps in the TiC particles are filled in with powder comprising at least one of boron nitride (BN), alumina ($Al_2O_3$), zirconia ($ZrO_2$) and silicon nitride ($Si_3N_4$).

20. The method for producing a melt supply pipe according to claim 5, wherein the Ni alloy, in addition to Ni, comprises about 2.6 to about 3.2% of B, about 18 to about 28% of Mo, about 3.6 to about 5.2% of Si and about 0.05 to about 0.22% of C.

* * * * *